June 11, 1963    C. L. CHRISTIANSON ETAL    3,093,774
MICROWAVE FERRITE-ROTATOR DEGAUSSING SYSTEM
Filed June 22, 1959

INVENTOR
Charles L. Christianson
J. Lane Ware

BY Robert T. Killman
ATTORNEY 3,093,774
MICROWAVE FERRITE-ROTATOR DE-
GAUSSING SYSTEM
Charles L. Christianson, 8205 Loch Raven Blvd., and
Joseph Lane Ware, 514 Epsom Road, both of Towson,
Baltimore County, Md.
Filed June 22, 1959, Ser. No. 822,140
1 Claim. (Cl. 317—157.5)

This invention relates generally to microwave ferrite devices and more particularly to the use of ferrites at microwave frequencies in which a superposed direct magnetic field is applied to the ferrite member for the purpose of modifying the effect on microwaves transmitted relative to the ferrite member.

Use of ferrite materials in microwave circuits has found wide application in systems which employ the Faraday rotation characteristics of the ferrite for the purpose of rotating polarization of microwave energy which is transmitted relative to the ferrite element. Devices which employ the principle of Faraday rotation may be adapted for use as microwave switches, isolators and various coupling circuits as well as for the basic arrangement which merely utilizes the characteristic of the ferrite to rotate the plane of polarization of the microwave energy. A particular application of the latter type of ferrite device is employed in radar systems wherein it is desired to radiate an electromagnetic field from the antenna with the waves polarized in different planes for different modes of operation. Thus, it may be desirable, for example, in an airborne radar system to employ horizontal polarization when the radar system is used for weather mapping while a vertically polarized plane wave may be preferred when the radar system is employed for ground mapping. Other arrangements of selective polarization radar systems are known wherein it may be desired to selectively radiate a plane polarized or a circular polarized wave or other combinations of polarizations.

Systems for providing selective polarization of the radiated energy of a radar system have been provided in the past and since the advent of microwave ferrites the employment of a ferrite element to control the polarization of the microwave energy has been widely used. The simplicity with which the transmission characteristics of a ferrite specimen can be controlled are an important factor in the widespread use of systems of this type. In general, the ferrite sample can be altered between the two desired conditions by the mere application of a unidirectional magnetic field which may conveniently be generated by a suitable solenoid energized with a direct current which can be switched on and off or varied in magnitude for the requisite degree of control. In such systems it has been found that the switching between two diverse states for the ferrite sample which corresponds to two different magnetic field strengths to which the sample is subjected has been accompanied by a hysteresis effect so that the operation of the ferrite sample in a strong magnetic field with the resultant high magnetizing force on the sample has produced a residual magnetism in the ferrite upon removal of the magnetic field. Under these conditions, a microwave device employing the characteristics of a ferrite for a zero field condition is impaired by the residual magnetism in the specimen.

It is an object of the present invention to provide improved magnetically controlled ferrite devices.

Another object of the invention is to provide an arrangement for eliminating the residual magnetism in a ferrite specimen employed selectively at different magnetic field levels.

A further object of the invention is to provide an improved radar system for altering the polarization of the radiated energy.

Another object of the invention is to provide in a direct current controlled ferrite rotator system a degaussing arrangement for effectively returning the ferrite sample to a zero field condition.

These and other objects of the invention will be clear from the following detailed description taken in conjunction with the accompanying drawing in which.

The present invention accomplishes an improvement in the operation of ferrite devices which are subjected alternately to strong unidirectional magnetic fields and relatively low or zero magnetic field strengths by providing a circuit arrangement in the current supply device to the solenoid for generating a selective magnetic field in a manner which effectively degausses the ferrite sample upon removal of the direct current energizing the solenoid which supplies the magnetic field to the ferrite.

Figure 1:
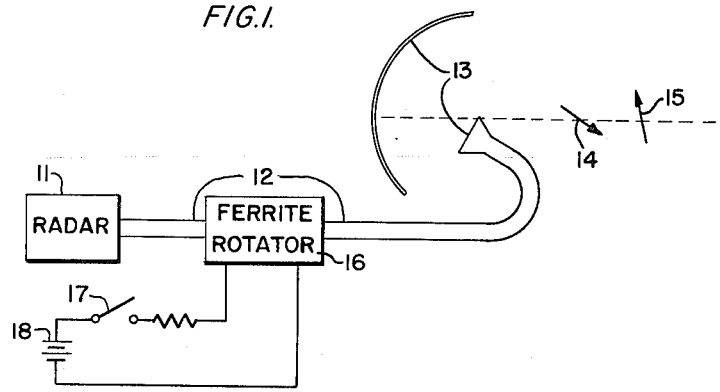
FIG. 1 is a block diagram partially schematic of a radar system employing a ferrite rotator.

Referring to FIG. 1 an application of a controlled ferrite device is shown in which a radar system 11 is coupled by a waveguide 12 to an antenna system 13 for the purpose of radiating electromagnetic energy into space. For the purpose of extending the utility of the radar system it is desired that in a particular application horizontally polarized energy may be radiated as indicated by arrow 14 or alternatively for other applications of the system it may be desired to radiate vertically polarized energy as indicated by arrow 15. To accomplish the alternate polarizations represented by arrows 14, 15, the ferrite rotator 16 is provided in the waveguide path 12 and operates in a known manner to rotate the plane of polarization of the energy in the waveguide by a 90° angle. Selective control of the rotator 16 may be achieved by means of a switch 17 which supplies a predetermined current from source 18 to a solenoid coil in the rotator 16 for producing a unidirectional magnetic field of predetermined strength.

Figure 2:
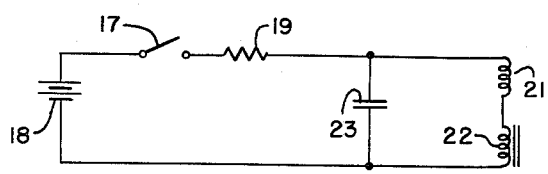
FIG. 2 is a schematic wiring diagram of a circuit in accordance with the invention.

The present invention provides in the circuit of FIG. 2 a control circuit for ferrite systems comprising the direct current source 18, control means such as switch 17, a current limiting or current determining device such as resistor 19 for supplying a current of predetermined magnitude to solenoid 21. Solenoid 21 is physically arranged with respect to a ferrite sample in rotator 16 in any particular system which the rotator is employed in a manner to apply the desired unidirectional magnetic field. The current through coil 21 also flows through an iron core choke 22 which is serially connected with solenoid 21. Across the serial combination of solenoid 21 and choke 22 is connected a capacitor 23 of predetermined value.

Figure 3:
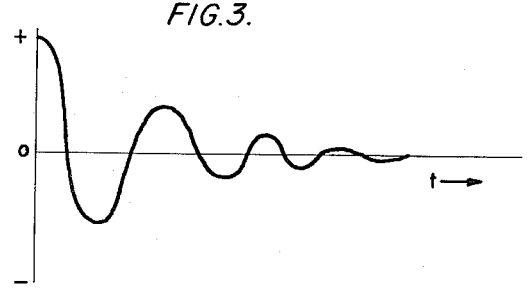
FIG. 3 is a current diagram useful in explaining the invention.

The operation of the present invention will be described with respect to FIGS. 2 and 3. Upon closure of switch 17 a predetermined current established by the serial resistance including resistor 19 in the circuit of solenoid 21 and choke 22 flows through the windings 21, 22 and produces the desired magnetic field effect on the ferrite sample of a rotator 16 or other device. Upon opening switch 17 the current through solenoid 21 starts to fall and in the absence of capacitor 23 and choke 22 would rapidly come to zero value without the demagnetizing of the ferrite sample in the magnetic field of solenoid 21. In a particular application the solenoid 21 may have an inductance of approximately 140 millihenries and for the purpose of the invention the choke coil 22 is added having an inductance of approximately 4 or 5 henries. This combination of inductance is connected with capacitor 23 which may be 0.1 microfarad, for example, to produce a damped oscillatory circuit having the ability to generate a negative current flow through the solenoid 21 relative to the steady state current therethrough. This current is generated by virtue of the large inductance provided by choke 22 and the damped oscillation which this inductance produces in combination with capacitor 23. The typical wave form for the current through the circuit comprising solenoid 21 and choke 22 and capacitor 23 is shown in FIG. 3 and constitutes the well known damped oscillatory current wave which alternates between positive and negative current values of diminishing amplitude until the amplitude approaches zero. With this arrangement the ferrite sample in solenoid 21 is effectively degaussed to produce zero remanence each time switch 17 is opened without the application of any additional control current or otherwise making provision for this result other than the addition of choke 22 and capacitor 23.

Figure 4:
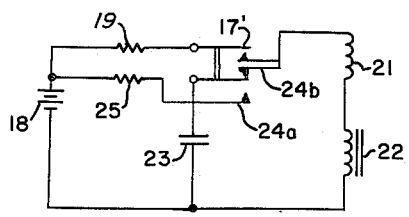
FIG. 4 is a modification.

The modification shown in FIG. 4 employs additional switching to disconnect the capacitor 23 and source 18 during the degaussing interval. Switch 17' controls the current rotator 21 and choke 22 as in FIG. 2. However, switch contact 24a connects capacitor 23 to source 18 through a resistor 25 when switch 17' is closed and 24b connects capacitor 23 across the series combination of rotator 21 and choke 22 when switch 17' is open. With this arrangement the shunt resistance across the oscillatory circuit can be reduced and the energy from the charged capacitor is available for degaussing the ferrite in addition to the magnetic energy of choke 22.

Many other applications of the principle of the present invention will now be apparent to those skilled in the art and are to be considered within the scope of the invention as defined by the appended claim.

We claim:

A microwave ferrite device comprising a ferrite element positioned to affect microwave energy, a field coil positioned to produce a magnetic field on said ferrite element, a choke coil connected in series with said field coil, a direct current source, a ground connection from said source to one of said coils, a double-pole double-throw switch, the contact closed by the first pole of said switch in the first position of said switch and the contact closed by the second pole of said switch in the second position of said switch being connected together and to the other of said series connected coils, means connecting the first pole of said switch to said current source, a capacitor connected between ground and the second pole of said switch, and means connecting said current source with the contact closed by the second pole of said switch in the first position of said switch.

References Cited in the file of this patent

UNITED STATES PATENTS

| | | |
|---|---|---|
| Re. 23,217 | Snyder | Apr. 4, 1950 |
| Re. 23,311 | Camras | Dec. 26, 1950 |
| 2,347,369 | Roters | Apr. 25, 1944 |
| 2,719,274 | Luhrs | Sept. 27, 1955 |
| 2,768,354 | Hogan | Oct. 23, 1956 |
| 2,810,867 | Gilbert | Oct. 22, 1957 |
| 2,898,408 | Folse | Aug. 4, 1959 |